Aug. 6, 1946. R. D. BROWN, JR 2,405,109
MEANS FOR TRANSLATING MECHANICAL ENERGY
Filed Oct. 1, 1943 2 Sheets-Sheet 1
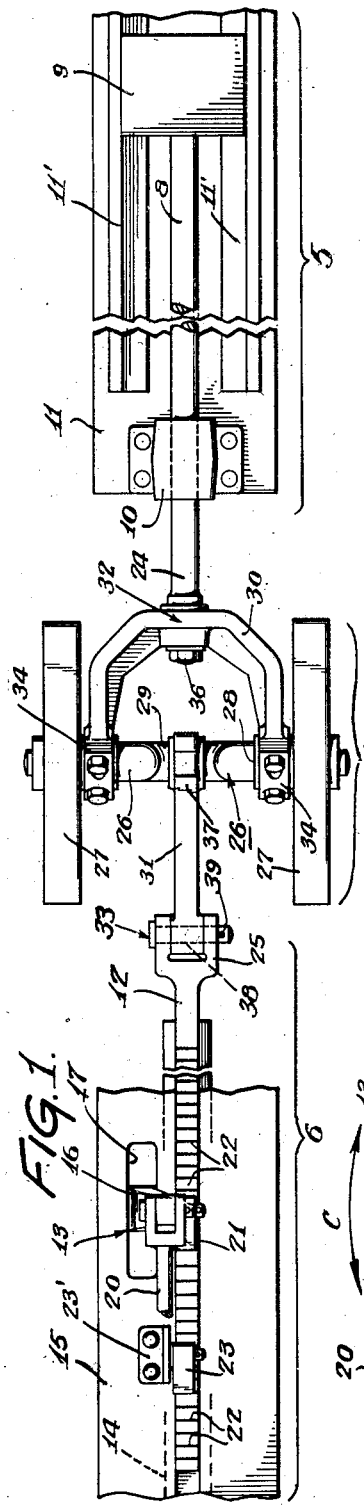
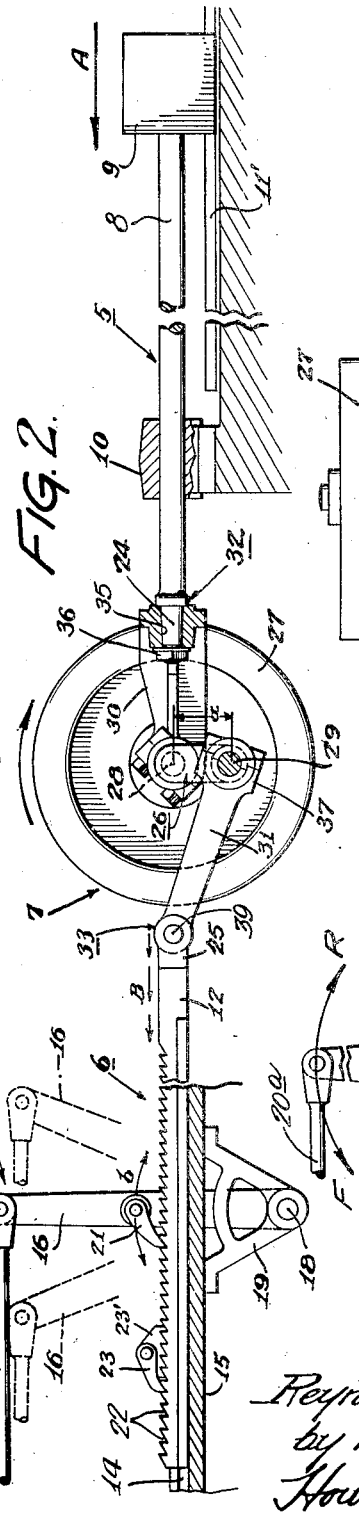
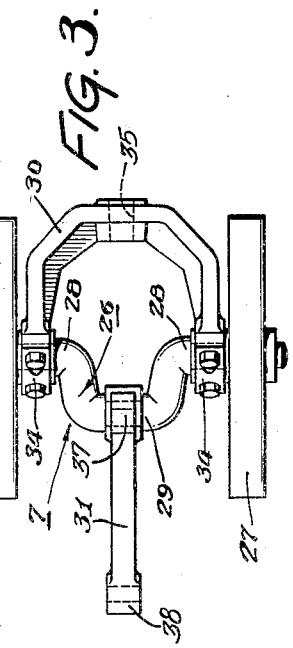
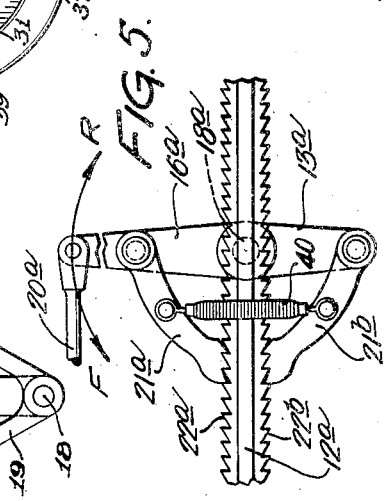
Inventor:-
Reynolds D. Brown Jr.
by his Attorneys
Howson & Howson Patented Aug. 6, 1946

2,405,109

UNITED STATES PATENT OFFICE 2,405,109

MEANS FOR TRANSLATING MECHANICAL ENERGY

Reynolds D. Brown, Jr., Blue Bell, Pa., assignor to Philco Corporation, Philadelphia, Pa., a corporation of Pennsylvania Application October 1, 1943, Serial No. 504,628

7 Claims. (Cl. 74—1)

This invention relates to means for effecting a substantially continuous application of mechanical energy to a load from an intermittently operating energy supply source. More specifically, the invention relates to means for translating an intermittent unidirectional movement into a continuous unidirectional movement.

The principal object of the invention is to provide a novel apparatus for the stated purpose.

Another object of the invention is to provide a novel energy-transmitting means between a periodically actuated driving member and a load-connected member to be driven thereby, said means functioning to eliminate, or at least reduce to a negligible amount, the pulsations normally transmitted to such a driven member by such a driving member.

A further object of the invention is to provide a device capable of being interposed in a system including at least two members arranged for unidirectional translatory motion in a single general direction, one of said members being intended to be driven by the other member to which is imparted an intermittent movement in one direction, said device forming the connection between said members and being acted upon by the intermittent movement of the driving member and in turn acting to drive the driven member during those periods when the driving member is at rest.

Other important objects and advantages of the invention will be apparent from the following description.

Briefly and generally stated, the invention contemplates the provision of a system including a rotatable crank shaft having one or more inertia members or flywheels carried thereby, for rotation therewith, the crank being connected with an intermittently advancing driving member, and the shaft proper axis being connected with a member to be driven rectilinearly by said driving member, the shaft being supported solely by said members, whereby each intermittent actuation of the driving member tends to advance the axis of said shaft while imparting a rotary motion thereto, said rotary motion storing sufficient kinetic energy in the flywheel to complete the rotation of said shaft and carry the driven member forward during intervals when the driving member is stationary. By reason of this operation, the driven member is moved continuously.

The invention and its mode of operation may be readily understood by reference to the accompanying drawings and following description.

In the drawings:

Fig. 1 is a plan view of a mechanism constructed in accordance with this invention;

Fig. 2 is a side elevational view of the mechanism with certain parts broken away for the sake of illustration.

Fig. 3 is a supplementary plan view of the translating device provided by the invention;

Fig. 5 illustrates a modified form of the driving means.

Figure 4:
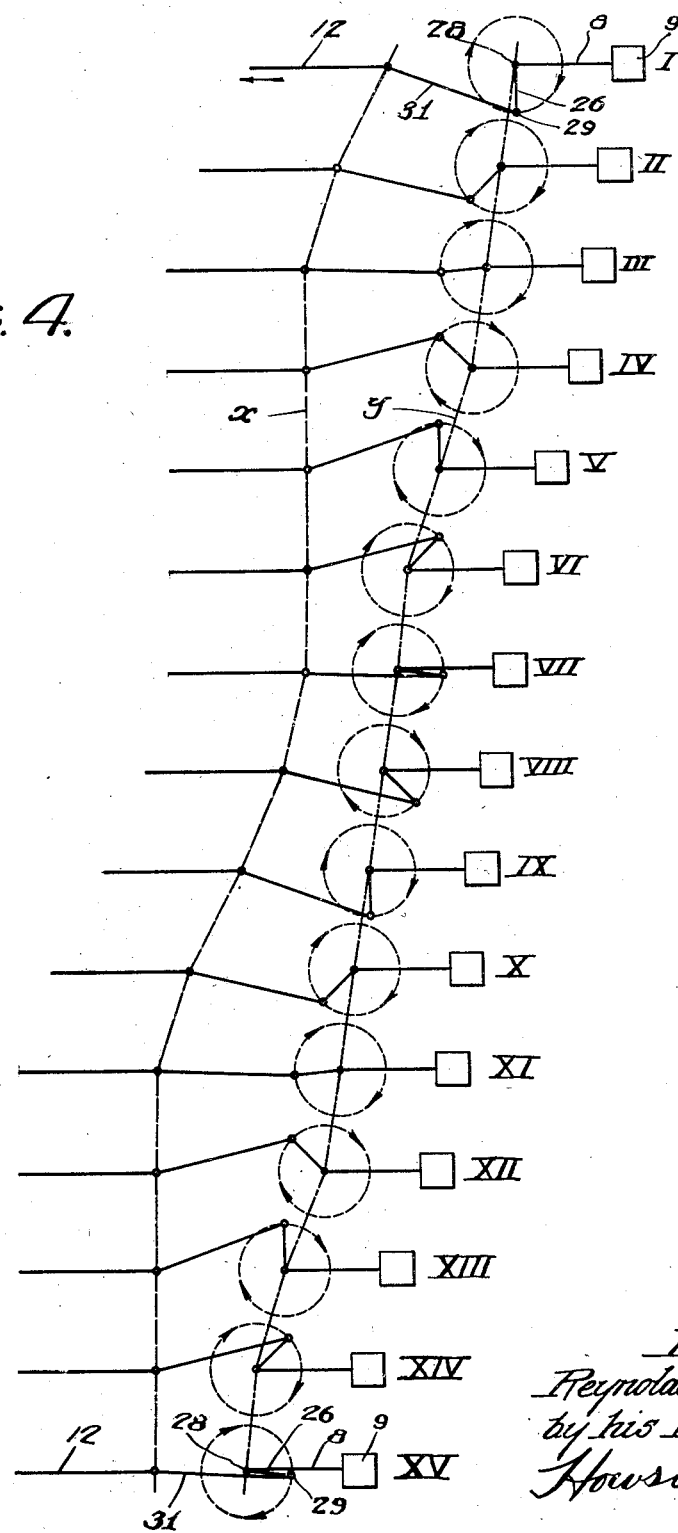
Fig. 4 is a diagrammatic representation of the action of the mechanism when in operation.

Referring more particularly to the drawings wherein like characters of reference designate corresponding parts throughout, the embodiment shown essentially comprises driven means, driving means, and translating means interposed between said driving means and said driven means. For convenience, these principal elements are indicated in their entirety, by the reference characters 5, 6 and 7 respectively.

The driven means 5 may comprise a member 8 arranged for rectilinear motion and adapted to have imparted to it the desired motion. For the purpose of illustration, the member 8 is shown in the drawings as a horizontally disposed rod, to one end of which is attached a load or weight 9, the movement of which is representative of work performed by the driven member. The member or rod 8 is intended to move in the direction indicated by the arrow A, and is freely supported in and slidably guided by a bracket 10 suitably arranged on a supporting surface 11. Also the load or weight 9 may be guided in its rectilinear motion by means of suitable track members 11' conveniently mounted on the supporting surface 11.

The driving means 6 may comprise a member 12 and a device 13 operable to impart to member 12 an intermittent driving motion in one direction as indicated by the broken arrows B, that is in the direction in which the driven member 8 is intended to move. For the purpose of illustration, member 12 is shown as a horizontally disposed rack bar slidably mounted in a guideway 14 formed upon a support 15; and the device 13 is shown as including a lever 16 extending through a slot 17 in the support 15 at a point adjacent said bar. The lower end portion of the lever 16 is pivotally connected, as at 18, to a suitable bracket 19 depending from the support 15, while the upper end portion of said lever is connected to a drive rod 20 adapted to be reciprocated, as indicated by the arrow C, by any suitable known means. A pawl 21 is carried by the intermediate portion of the lever 16 and is located thereon to engage the teeth 22 of the rack bar 12. Thus, it will be understood that upon reciprocation of the drive rod 20, the lever 16 is rocked about its pivotal connection 18, causing the pawl 21 to cofunction with the rack bar 12 so as to impart to the latter a by-step motion.

In order to prevent reverse movement of the rack bar 12, there may be provided a locking pawl 23 engageable with the teeth 22 of said bar and pivotally carried by means of a bracket 23' on the supporting surface 15.

As more clearly shown in Fig. 2 of the drawings, the driven member or rod 8 and the driving member or rack bar 12 are preferably arranged in longitudinal alignment in a common plane and have their opposed end portions 24 and 25, respectively, spaced from one another but interconnected by the translating device 7, now to be described.

The device 7 comprises an eccentric or crank member 26 provided with one or more flywheels or inertia members 27, and having relatively offset portions 28 and 29 respectively associated with linking elements 30 and 31, one linking element 30 being adapted for rigid engagement, as shown at 32, with the free end portion 24 of the driven member or rod 8, and the other linking element 31 being adapted for pivotal engagement, as shown at 33, with the adjacent end portion 25 of the driving member or rack bar 12.

As particularly shown in Fig. 3 of the drawings, the eccentric member 26 may take the form of a crank shaft with axially aligned portions 28 and an intermediate offset portion 29. Preferably the end portions 28 are each provided with a flywheel 27, although a single flywheel may be mounted on one or the other of said end portions.

The linking element 30 adapted for engagement with the driven member or rod 8 is preferably of generally U-shaped configuration and terminates in a pair of bearings 34 respectively engaging the end portions 28 of the crank shaft 26 for free rotation of the latter. The intermediate portion of the U-shaped link 30 is adapted to be secured to rod 8; for example by the provision of an aperture 35 for receiving the free end 24 of rod 8 which may then be secured rigidly to said link by means of a suitable element, for instance a nut 36, as shown in Figs. 1 and 2.

The linking element 31 which is adapted for pivotal engagement with the driving member or bar 12, preferably comprises an arm formed at one end with a bearing 37 rotatably engaging the intermediate offset portion 29 of the crank shaft, and at the other end with an apertured portion 38 adapted to receive a pivot pin 39 associated with the adjacent end of said driving member or bar to constitute the pivotal connection 33 therebetween.

From the foregoing description, it will be noted that the crank shaft 26 and the flywheel or flywheels 27 rigid therewith are supported solely by the driven member 8 and driving member 12 through the connecting link elements 30 and 31. Thus, it will be seen that the axis of the crank shaft 26 is free to follow the displacement of the driving member 12 which effects displacement of the driven member 8 during operation of the mechanism.

The operation of the mechanism may be better understood by reference to the diagrammatic illustration of Fig. 4, which shows by a series of successive steps, the cooperative functioning of the various parts in translating the intermittently advancing rectilinear motion of the driving member 12 into a substantially continuous progressive rectilinear motion of the driven member 8.

At the outset it is pointed out that when the mechanism is at rest, the parts are disposed as shown at I, because of the weight of the offset portion 29, of the crank shaft 26 and of the linking element 31 pivotally connected thereto. In this position the pawl-carrying lever 16 (not shown in Fig. 4) is located substantially halfway between the extreme ends of its stroke, as represented in Fig. 2. In this connection, it is important to note that the length of the crank as indicated at $a$ in Fig. 2 is substantially half the length of the stroke as represented at $b$ in the same figure. For this reason it will be understood that the rotary motion of the flywheel-carrying crank shaft 26 is continuous and non-periodic although the movement of the motion imparting member is intermittent and periodic as will hereinafter be more fully described.

Upon starting the mechanism, the driving member 12, is given its initial thrust in the direction indicated in Fig. 4, which actuates the parts through the various stages from position I to position III. In so doing, combined rotary and rectilinear motions are imparted to the crankshaft 26 and the flywheel thereon, the rotary motion storing kinetic energy in the flywheel and the rectilinear motion moving the driven member 8 with its load or weight 9 in the general direction indicated by the arrow A, Fig. 2. In other words, a portion of the applied energy moves the translating device, and hence member 8, rectilinearly while the remainder of the applied energy is stored in the flywheel and imparts rotary motion thereto.

It will be understood that the distance travelled by the driven member 8 through rectilinear motion imparted to the crankshaft 26 by actuation of the driving member 12 depends largely on the mass, inertia, weight, size, etc., of the parts, and that therefore, the distance of travel represented in Fig. 4 has been arbitrarily chosen solely for the purpose of illustration.

When the parts reach approximately position III, the motion of the intermittently driven member 12 stops, but the flywheel continues to rotate because of the kinetic energy stored therein, thus continuing the movement of the driven member 8 and its load or weight 9 due to the function of the crankshaft in passing through the successive stages from position III to position VII.

The driving member 12 is again actuated for displacement in its general direction of movement when the parts reach approximately position VII, thus again imparting combined rotary and rectilinear motions to the crankshaft 26 and the flywheel thereon, carrying the parts through the successive stages from position VII to position XI. Thereupon the motion of the driving member 12 again stops but the flywheel continues to rotate through the successive stages from position XI to position XV, rotating the crankshaft and thereby continuing the progressive motion of the driven member 8 and its load or weight 9. The operating cycle is repeated as long as the driving member is operated.

It will be seen from the foregoing discussion that the inertia member or flywheel of the translating device 7 must be so constructed that during the time when the driving means 6 drives said member or flywheel, sufficient energy is stored in the latter to overcome the energy dissipated in the driven means 5 during the time when the driving member 12 is at rest. Within reasonable limits, the device will operate at the proper speed to attain the best condition under which the intermittent motion applied to said device by the driving member 12 is rendered continuous. This is evident when it is considered that if the rate of the intermittent motion of the driving member is increased slowly, the speed of rotation of the inertia member or flywheel will increase accordingly, but if the rate of intermittent motion of the driving member decreases slowly, the inertia member or flywheel will rotate at a slower speed. In either event, the motion of the driven member will continue to be smoothed out as compared with that of the driving member.

From the foregoing it will be understood that whereas the actuation of the driving member 12 is intermittent or periodic the actuation of the driven member 8 is substantially continuous, and the continuous motion of the driven member is caused in part by the movement of the driving member and in part by the rotary movement of the flywheel, which, without interruption transmits motion to said driven member through the crankshaft during the intervals or periods when the driving member is stationary. As a result, the pulsating motion of the driving member 12 is translated into a substantially continuous motion as will appear from a comparison of broken lines $x$ and $y$ in Fig. 4. These lines are, in effect, graphs of the two motions.

It is particularly to be noted that, by connecting in the system a plurality of flywheel-carrying crank shafts in series, still greater smoothness in the continuous operation of the driven member may be readily obtained.

Also an increased smoothness in operation may be obtained by imparting double pulsations to the driving member. A typical embodiment for accomplishing this purpose is illustrated in Fig. 5 of the drawings wherein the driving member is shown as a double rack bar 12a actuated by a double ratchet device 13a. This device may comprise a lever 16a suitably pivoted at 18a and carrying a pair of spaced and oppositely arranged pawls 21a and 21b, the pawl 21a being disposed to engage one set of teeth 22a on the rack bar 12a and the other pawl 21b being disposed to engage the other set of teeth 22b on said rack bar. A spring 40 maintains the pawls in position.

Because of this construction, it will be understood that the rack bar 12a is subjected to double pulsations, one pulsation occurring when the drive rod 20a operates to move the lever 16a in its forward stroke, as indicated by arrow F, and the other pulsation taking place when the drive rod operates to move the said lever in its return stroke, as indicated by arrow R.

The operation of the mechanism with the double pulsating device is similar to that hereinbefore described, it being understood that the actuation of the drive rod 20a is such that the flywheel 27 makes a complete revolution for each forward movement of the drive rod and a complete revolution for each return movement of said rod.

As an example of the practical application of the system herein described, it is pointed out that the invention is readily adaptable to certain types of machinery intended for special work. For instance, in a machine intended to cut a microscopic spiral groove in a continuously rotated work-piece by means of a progressively moving cutting tool, it is found necessary to advance the progressively moving cutting tool in precise and calculated synchronization with the rotation of the work piece, in order that the spiral groove may have that degree of uniformity in breadth and in the spacing between adjoining convolutions which the work requires. To accomplish this purpose, it is customary to interconnect the rotating drive for the work-piece and the operating jig for the cutting tool by a series of gears so chosen that the cutting tool is actuated in proper predetermined relationship with the actuation of the work-piece. Such an arrangement, however, not only results in a cumbersome structure, but also complicates the machine and demands extreme accuracy with very little, if any, tolerance from the standpoint of machine building and assembly and therefore adds materially to the cost of production.

By using the present system in such a machine, the desired results may be accomplished, without the disadvantages and objections encountered in the known systems heretofore employed. The device 13, operating to periodically advance the driving member 12, may be readily connected to the prime mover of the machine and the driven member 8 may readily be associated with the cutting tool to actuate the latter. In this manner expensive and complicated gearings are dispensed with.

In a broad sense, the invention serves to apply mechanical energy to a load with substantial continuity, from an intermittently operable energy source. Thus in the illustrated embodiment the driving member 12 and its actuating means constitute an intermittently operable source of energy. The device of the invention applies some of the energy to the load during the active periods of the energy source and also stores a part of the energy during such periods, and it applies the stored energy to the load during the quiescent periods of the energy source.

It is to be understood that the embodiments herein disclosed are not to be taken as limiting the invention, and that the invention is capable of modifications, without departing from the spirit or scope thereof. Accordingly, those modifications coming within the scope of the appended claims are to be considered as embodiments of the invention.

I claim:

1. In a mechanism of the character described, a rotatable element having relatively eccentric portions and capable of having kinetic energy stored therein, a driven member, a driving member, said members respectively engaging said portions and supporting said element for free rotation, and means operable to impart intermittent motion in one direction to said driving member, said last means also being operable to impart rotary motion to said rotatable element and accordingly store kinetic energy therein, thereby causing the continued rotation of said element for continuing the advancement of said driven member in said one direction during those periods when said driving member is substantially at rest.

2. In a mechanism of the character described, a shaft having axially aligned end portions and an intermediate offset portion, a flywheel associated with said shaft, a member having means engaging said offset portion of the shaft, another member having means engaging said end portions of the shaft and supporting the same for free rotation thereof, and means operable to impart intermittent motion in one direction to one member, thus advancing the other member in said one direction and subjecting the shaft to a rotatable motion to store kinetic energy in said flywheel, thereby causing the latter to maintain the rotation of the shaft for continuing the advancement of said other member in said one direction during those periods when said one member is moving at a rate slower than its average speed.

3. In a mechanism of the character described, a shaft having axially aligned end portions and an intermediate offset portion, a flywheel associated with said shaft, a driven member engaging said end portions of the shaft and supporting the same for free rotation, and an intermittently operated driving member engaging said offset portion of the shaft for its free rotation and operable for movement in one direction to advance the driven member in said one direction and subject the shaft to a rotatable motion to store kinetic energy in said flywheel, thereby causing the latter to maintain the rotation of the shaft for continuing the advancement of said driven member in said one direction during those periods when said driving member is moving at a rate slower than its average speed.

4. The combination with a driving member operated for intermittent movement in one direction and a member to be driven thereby to follow the movement thereof, of connecting means between said members, said connecting means including a rotatable eccentric member provided with offset portions respectively engaged by the driving member and the member to be driven thereby and further provided with means capable of having kinetic energy stored therein, whereby the driving member when moving more rapidly than its average speed acts on said last-named means to store kinetic energy therein while displacing the same in said one direction, the kinetic energy thus stored in said last-named means creating a rotary force therein for continuing the rotation of the eccentric member and accordingly continuing the movement of the driven member in said one direction during those periods when the driving member is moving at a rate slower than its average speed.

5. The combination with a driving member operated for intermittent movement in one direction and a member to be driven thereby to follow the movement thereof, of connecting means between said members, said connecting means including a crank shaft having its offset portions respectively engaged by the driving member and the member to be driven thereby, and means associated with said crank shaft and capable of having kinetic energy stored therein, whereby the driving member when moving more rapidly than its average speed acts on said last named means to store kinetic energy therein while displacing the axis of the crank shaft, the kinetic energy thus stored in said last-named means creating a rotary force therein for continuing the rotation of the crank shaft and accordingly continuing the rectilinear motion of the driven member in said one direction during those periods when the driving member is moving at a rate slower than its average speed.

6. In a mechanism of the class described, a movable member, driving means for said member operable in two directions and adapted to actuate said member in one direction during the movement of the driving means in both directions, whereby said member is moved intermittently in said one direction, a driven member arranged for rectilinear movement, a crank shaft having relatively offset portions rotatably connected to said members respectively, and at the least one flywheel carried by said shaft, whereby said driven member has imparted to it a substantially continuous rectilinear unidirectional movement.

7. In a mechanism of the class described, a driving member, means for imparting intermittent motion in one direction to said driving member, a driven member, a crank shaft having relatively offset portions rotatably connected to said members respectively, and at least one flywheel carried by said shaft, whereby said driven member has imparted to its a substantially continuous unidirectional movement.

REYNOLDS D. BROWN, Jr.